United States Patent [19]

Stanley

[11] Patent Number: 4,949,429
[45] Date of Patent: Aug. 21, 1990

[54] STUFFING HORN ASSEMBLY

[75] Inventor: Thomas R. Stanley, Kansas City, Mo.

[73] Assignee: Teepak, Inc., Westchester, Ill.

[21] Appl. No.: 406,922

[22] Filed: Sep. 13, 1989

[51] Int. Cl.$^5$ ............................................. A22C 11/02
[52] U.S. Cl. ............................................ 17/41; 17/35
[58] Field of Search .............................. 17/41, 32–35, 17/38, 40; 426/138, 140

[56] References Cited

U.S. PATENT DOCUMENTS

| | | | |
|---|---|---|---|
| 3,659,317 | 5/1972 | Kupcikevicius | 17/35 |
| 3,703,064 | 11/1972 | Lugiewicz | 53/122 |
| 3,805,329 | 4/1974 | Kollross | 17/33 |
| 3,889,013 | 6/1975 | Moule | 426/513 |
| 3,964,236 | 6/1976 | Smith | 53/122 |
| 4,051,574 | 10/1977 | Gaspar | 17/41 |
| 4,142,273 | 3/1979 | Gay | 17/41 |
| 4,570,298 | 2/1986 | Tribbett | 17/41 |

FOREIGN PATENT DOCUMENTS 1350069 12/1963 France ................................. 17/35

*Primary Examiner*—Willis Little
*Attorney, Agent, or Firm*—Howard M. Ellis; Michael L. Dunn

[57] ABSTRACT

A stuffing horn assembly is disclosed which comprises a hollow main member, said main member having an exterior end surface terminating in a convex configuration and containing at least one outlet void therein; a horn turret, having a concave exterior surface for generally engaging the convex exterior end surface of the main member and having at least one inlet void therein; means for mounting said horn turret concave surface to the convex surface of the main member; means for aligning said at least one outlet void with said at least one inlet void; and, said horn turret comprising horn means alignable with said at least one inlet void. The stuffing horn assembly has particular utility in the food processing industry, most particularly wherein comminuted meat products are stuffed into encasements under pressure.

32 Claims, 1 Drawing Sheet

STUFFING HORN ASSEMBLY

This invention relates to an improved turret horn assembly useful in the packaging of flowable materials. The invention has wide application but has particular utility in the food processing industry. The invention particularly relates to an improved multiple horn assembly useful in simultaneously and/or alternately filling multiple encasements with flowable materials.

In many industries wherein flowable materials are packaged for handling it is common practice to pass the flowable material through a horn assembly into the designated package. In the food processing industry it is common practice to stuff various foods, particularly finely divided food products, through a stuffing horn into flexible encasements for processing or sale. For example, the meat products industry uses a stuffing horn assembly to stuff flexible encasements in the formation of sausages and similar meat products from finely divided or otherwise comminuted meat compositions. Flexible encasements are similarly stuffed with cheese in the dairy products industry and a multitude of other similarly packaged food products have been manufactured or proposed.

For many years processes for filling or stuffing various encasements required extensive manual manipulation and with such limitation there was little need for improvement to the basic single horn stuffing apparatus. In recent years there have been significant advances in the art, and the use of more sophisticated stuffing machinery has created a need for greater manufacturing and process flexibility at the stuffing horn assembly.

One need at the stuffing horn assembly is a convenient means to change the size and/or shape of stuffing horns without significant interruption of the manufacturing process. Such means would allow greater flexibility of product production and could significantly reduce the cost and time of manufacture of multiple specialty products. Another need at the stuffing horn assembly is a convenient means to replace the supply of flexible encasement material without significant interruption of the manufacturing process. A still further need is for a stuffing horn assembly which will allow simultaneous stuffing of two or more encasements at a single station.

The apparatus disclosed in U.S. Pat. No. 4,142,273 represents one means to meet the need for conveniently replacing the supply of flexible encasement material by providing a multiple horn construction for a stuffing apparatus. With such apparatus, as flexible encasement material becomes depleted from a stuffing horn a fully loaded stuffing horn can be positioned in its place to allow continuation of the manufacturing process with minimal interruption. A problem with such horn assembly however is that it comprises an assemblage of several removable parts which during a pressurized stuffing process can be the source of leakage and requires multiple direction changes to the flow of food product being stuffed into the encasements. Because of the multiplicity of parts the assembly contains many joints which require constant attention to avoid leaks. The convoluted flow of the food product, from supply to encasement, can add pressure demands to the stuffing process and create barriers to the free flow of food product.

SUMMARY OF THE INVENTION

The stuffing horn assembly of the present invention briefly comprises a flowable material transmission means with a convex end containing an outlet therein. Mounted on the convex end is a stuffing horn turret which has a concave exterior surface that generally engages the convex configuration of the end of the transmission means in a ball and socket relationship. The stuffing horn turret has one or more stuffing horns thereon which are arranged to be alignable with an outlet of the transmission means upon indexing the turret about the outlet. Preferably the stuffing horns are removably mounted on the turret such that the same or different sized horns can be contained on the turret at any given time.

It is therefore an object of the present invention to provide an improved stuffing horn assembly.

It is a further object to provide an improved stuffing horn assembly having few component parts.

It is a still further object of the present invention to provide an improved stuffing horn assembly which allows convenient means to change stuffing horns.

These and other objects of the invention, features and advantages will become apparent from the detailed description hereinafter set forth.

BRIEF DESCRIPTION OF THE DRAWINGS

In the description which follows reference will be made to the drawings which comprise the figures described below.

DESCRIPTION OF THE PREFERRED EMBODIMENT

Figure 1:
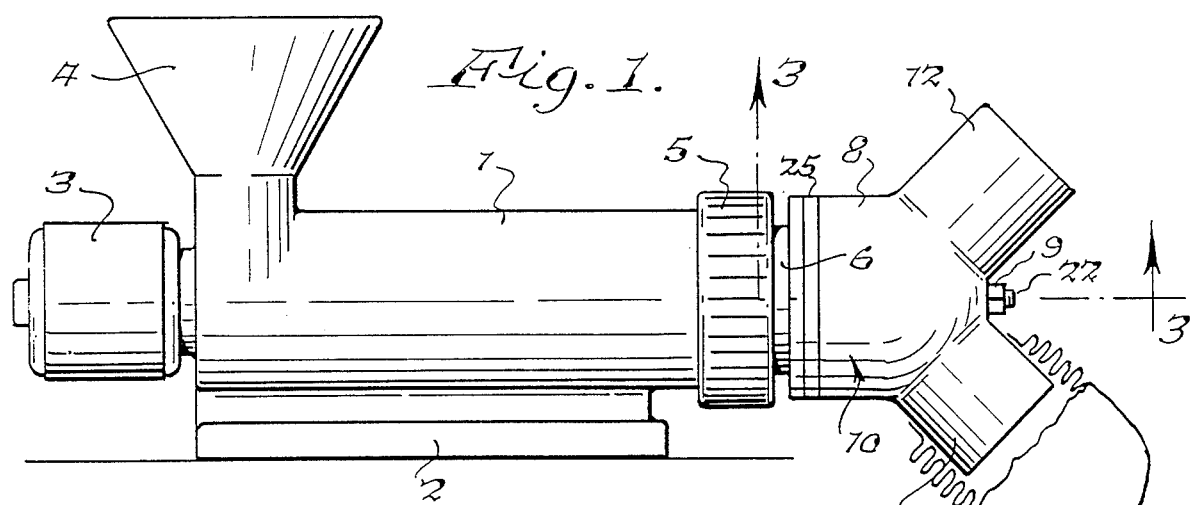
FIG. 1 is a perspective view of a two horn assembly of the present invention in combination with a typical food stuffing apparatus.

Referring to the drawings, FIG. 1 comprises a side elevation view of a typical arrangement of the turret horn assembly 10 of the invention within a food stuffing apparatus. The food stuffing apparatus generally comprises a motorized means for directing food from a loading point through the turret horn assembly into encasements which typically are fitted over a horn of the horn assembly. In the arrangement of FIG. 1, stuffing cylinder 1, mounted on frame 2, terminates at one end with turret horn assembly 10 fitted with a flexible casing 11 and at the other end with drive means 3. Loading hopper 4 communicates with stuffing cylinder 1 and provides a means to load flowable material such as food into the stuffing cylinder. Within the cylinder is typically a ram compressor, feed screw or the like which is driven by drive means 3 in such manner as to transport material from the stuffing cylinder through the turret horn assembly, outletting through a turret horn to a flexible encasement 11. The turret horn assembly 10 is typically removably attached to the stuffing cylinder by attachment collar 5 and generally comprises a hollow main member also referred to as transmission tube 6, turret seal 7 (turret seal shoulder 25 is depicted in FIG. 1), horn turret 8 and locking nut 9 on threaded post 22.

The operation of the food stuffing apparatus of FIG. 1 is that food to be stuffed into encasements is loaded into loading hopper 4 for delivery to cylinder 1. Drive means 3 drives a ram, screw feed or the like, contained in cylinder 1, which forcibly transports the food away from loading hopper 4 through stuffing cylinder 1, toward and through horn turret assembly 10 to flexible encasements 11 fitted over one or more horns.

The stuffing cylinder typically compresses the food as a part of the transport activity, but such may not be desirable or appropriate for some foods. The food can be in any desired form, providing it is transportable through a horn for encasement as desired. For example, the food may comprise meat pieces which are compacted and delivered in discrete pieces to the encasement, or, may comprise a meat emulsion or the like. The food might also be a grain, corn, peas and the like or it might comprise a cheese, a spread or the like. The food may be tightly compacted or stuffed into a flexible encasement under pressure, such as with sausages and the like, or it may be loosely compacted or partially fill an encasement without being under pressure within the encasement.

Figure 2:
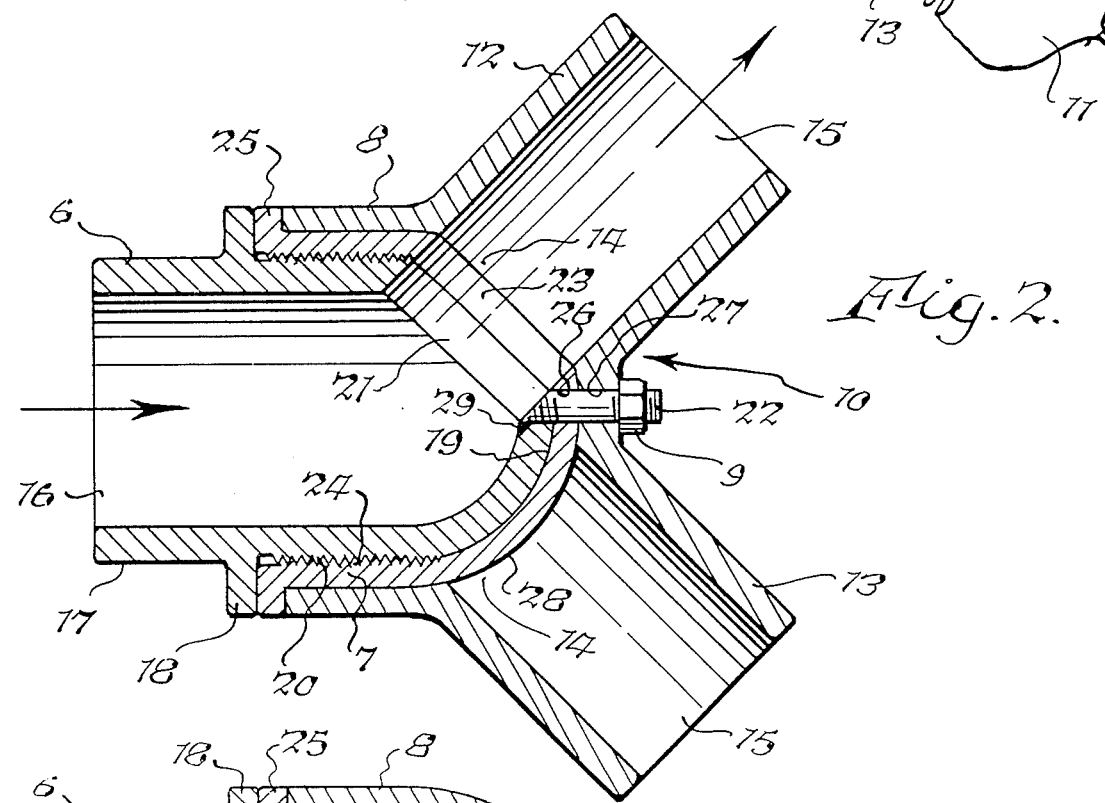
FIG. 2 is an enlarged, longitudinal sectional view of the two horn assembly of FIG. 1 taken along line 2—2 of FIG. 3.
Figure 3:
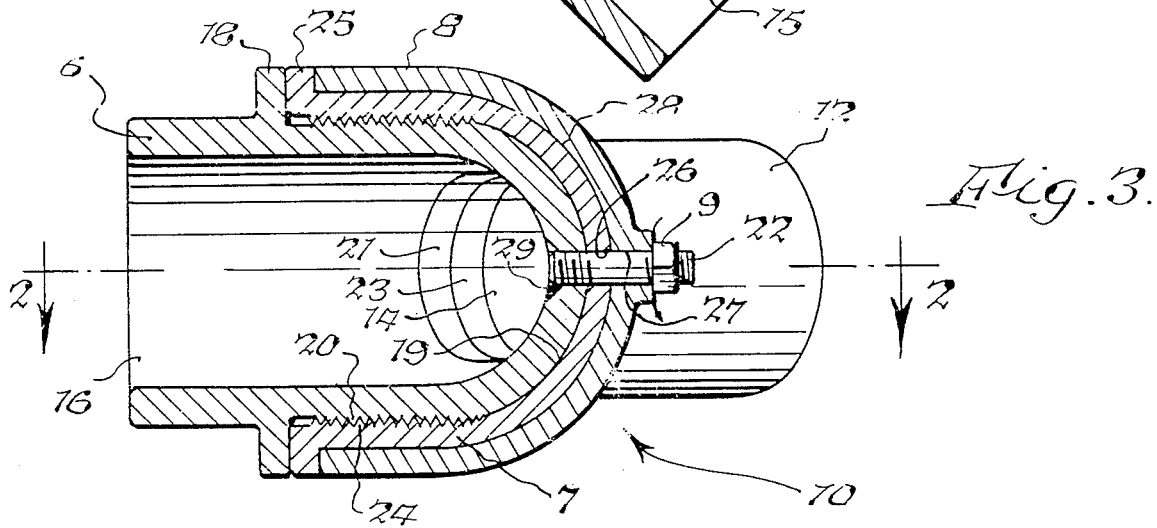
FIG. 3 is an enlarged, partial sectional, perspective view of the two horn assembly of FIG. 1 taken along line 3—3 of FIG. 1.

FIG. 2, provides an enlarged sectional view of a two horned 12, 13 turret apparatus 10 of the invention comprising one outlet in the transmission tube 6. Transmission tube 6, comprises transmission tube inlet 16, transmission tube inlet end 17, transmission tube shoulder 18, convex outlet end 19, outlet end threads 20, outlet hole 21, and threaded post 22 fixed to convex outlet end 19 by weld 29. Turret seal 7, is threaded onto transmission tube outlet end threads 20 of transmission tube outlet end 19 by means of turret seal threads 24 with turret seal shoulder 25 contacting transmission tube shoulder 18 and turret seal outlet hole 23 aligning with transmission tube outlet hole 21 to allow through flow of food material. Threaded post 22 is axially mounted at the convex outlet end 19 of transmission tube 6 and provides an axis for mounting turret seal 7, through turret seal mounting hole 26, and horn turret 8 through horn turret mounting hole 27.

Horn turret 8, comprises horns 12 and 13 and has horn inlets 14 at concave horn surface 28 and horn outlets 15. Each horn may be intimately or removably attached to the horn turret. The horn inlets 14 are sized to generally conform with transmission tube outlet hole 21 and turret seal outlet hole 23, and are alignable therewith, to allow through flow of food material. It should be understood that it is specifically contemplated that horn inlets 14 may be larger or smaller than outlet holes 21 and/or 23 to allow restriction of the flow of food or expansion of food flowing therefrom. Horn outlets 15 are generally the same size as horn inlets 14 but may be larger or smaller depending upon the size of the selected flexible encasement to be filled and/or the filling effect desired. Horns 12, 13 may also be of the same or different lengths or diameters with the selection again being dependent upon the contemplated use or desired filling effect.

The threaded post 22 and locking nut 9 arrangement provides a convenient means for tightening and loosening horn turret 8 to the turret horn assembly while allowing rotatable movement about the convex outlet end of the transmission tube. It should be understood that other means are also within the contemplation of the invention to achieve the same function, such as bolt means, wherein a bolt is screwed into the convex outlet end to tighten and loosen the turret horn to the assembly. Other contemplated means include pivot cam means, wherein a cam is removably or otherwise attached to an axial post and tightening and/or loosening of the horn turret is achieved by cam movement, or clamping means which hold the horn turret to the transmission tube by utilizing the transmission tube shoulder.

Generally, the turret horn assembly can be manufactured from any convenient materials. Typically, for the food processing industry, the horn turret and the transmission tube would be manufactured from aluminum or stainless steel or other corrosion resistant materials such as various non-reactive polymers and the like. The turret seal would typically be manufactured from a polymer that would allow convenient compression sealing between the convex surface of the transmission tube and the concave surface of the horn turret, yet act as a bearing surface for rotating the horn turret. A convenient seal material for such purpose is the various nylon polymers and the like.

The disclosed methods and apparatus are intended to be representative of various preferred forms of the the invention and are intended to be illustrative only. It is to be understood that the invention is to be limited only by the following claims and their equivalents.

What is claimed is:

1. A turret horn assembly comprising a hollow main member, said hollow main member having an exterior end surface terminating in a convex configuration which contains at least one outlet void therein; a horn turret, having a concave exterior surface for generally engaging the convex exterior end surface of the main member and having at least one inlet void therein; means for mounting said horn turret concave surface to the convex surface of the main member; and, means for aligning said at least one outlet void with said at least one inlet void, said horn turret comprising horn means alignable with said at least one inlet void.

2. The turret horn assembly of claim 1 comprising sealing means between said main member, convex exterior end surface and said horn turret concave exterior surface.

3. The turret horn assembly of claim 2 wherein said sealing means comprises a bearing surface.

4. The turret horn assembly of claim 3 wherein said sealing means comprises a polymer bearing surface.

5. The turret horn assembly of claim 1 wherein said horn turret comprises multiple inlet voids, each alignable with a horn means.

6. The turret horn assembly of claim 1 comprising at least two inlet voids.

7. The turret horn assembly of claim 1 wherein the horn turret is rotatably mounted to a convex end surface of said main member.

8. The turret horn assembly of claim 7 wherein the horn turret, concave exterior surface comprises at least two inlet voids which, upon indexed rotation of the turret, successively align with an outlet void of the main member.

9. The turret horn assembly of claim 7 wherein the horn turret, concave exterior surface comprises multiple inlet voids each of which, upon indexed rotation of the turret, align with at least one of multiple outlet voids of the main member.

10. The turret horn assembly of claim 8 comprising two outlet voids.

11. The turret horn assembly of claim 6 having horns aligned with said inlet voids.

12. A material packaging apparatus comprising a turret horn assembly of claim 1.

13. A food packaging apparatus of claim 12 comprising a stuffing cylinder, a loading hopper and drive means to transport food from the stuffing cylinder through the turret horn assembly to a flexible encasement.

14. The food packaging apparatus of claim 13 wherein food is compacted in the stuffing cylinder and stuffed into a flexible encasement.

15. The food packaging apparatus of claim 14 wherein said food comprises meat.

16. The food packaging apparatus of claim 14 wherein said flexible encasement is comprised of a material selected from regenerated cellulose, collagen and polymer.

17. The food packaging apparatus of claim 14 wherein said flexible encasement is comprised of regenerated cellulose.

18. A food packaging apparatus of claim 13 wherein said turret horn assembly comprises sealing means between said main member, convex exterior end surface and said horn turret concave exterior surface.

19. The apparatus of claim 18 wherein said sealing means comprises a bearing surface.

20. The apparatus of claim 18 wherein said sealing means comprises a polymer bearing surface.

21. The apparatus of claim 18 wherein the horn turret comprises multiple inlet voids, each alignable with a horn means.

22. The apparatus of claim 18 comprising at least two inlet voids.

23. The apparatus of claim 18 wherein the horn turret is rotatably mounted to a convex end surface of said main member.

24. The apparatus of claim 18 wherein the horn turret, concave exterior surface comprises at least two inlet voids which, upon indexed rotation of the turret, successively align with an outlet void of the main member.

25. The apparatus of claim 23 wherein the horn turret, concave exterior surface comprises multiple inlet voids each of which, upon indexed rotation of the turret, align with at least one of multiple outlet voids of the main member.

26. The apparatus of claim 24 comprising two outlet voids.

27. The apparatus of claim 24 having horns aligned with said inlet voids.

28. A method of packaging flowable materials comprising comprising transporting said material by means of a stuffing cylinder, through a turret horn assembly of claim 1 to a flexible encasement.

29. The method of claim 28 wherein food is compacted in the stuffing cylinder and stuffed into a flexible encasement.

30. The method of claim 29 wherein said food comprises meat.

31. The method of claim 29 wherein said flexible encasement is comprised of a material selected from regenerated cellulose, collagen and polymer.

32. The method of claim 31 wherein said flexible encasement is comprised of regenerated cellulose.

* * * * *